(12) United States Patent
Rast (10) Patent No.: US 6,486,798 B2
(45) Date of Patent: Nov. 26, 2002

(54) SYSTEM AND METHOD OF PREVENTING AIRCRAFT WING DAMAGE

(75) Inventor: Rodger H. Rast, Rancho Cordova, CA (US)

(73) Assignee: Rastar Corporation, Gold River, CA (US)

( * ) Notice: Subject to any disclaimer, the term of this patent is extended or adjusted under 35 U.S.C. 154(b) by 0 days.

(21) Appl. No.: 09/854,028

(22) Filed: May 11, 2001

(65) Prior Publication Data

US 2002/0018009 A1 Feb. 14, 2002

Related U.S. Application Data (60) Provisional application No. 60/203,564, filed on May 11, 2000.

(51) Int. Cl.[7] .................................................. G08G 5/04
(52) U.S. Cl. .................... 340/961; 340/435; 340/932.2; 340/946; 340/958; 362/470
(58) Field of Search ............................. 340/958, 932.2, 340/903, 435, 961, 946; 362/470; 244/114 R; 701/301

(56) References Cited

U.S. PATENT DOCUMENTS

| | | | | |
|---|---|---|---|---|
| 3,235,838 A | * | 2/1966 | Hilt ............................ | 340/948 |
| 4,367,514 A | * | 1/1983 | Large et al. ................. | 362/346 |
| 4,495,549 A | * | 1/1985 | Carlson et al. .............. | 362/293 |
| 4,916,445 A | * | 4/1990 | Crossley ...................... | 340/946 |
| 5,315,296 A | * | 5/1994 | Kaiser et al. ................ | 340/946 |
| 5,719,568 A | * | 2/1998 | Adams ......................... | 340/961 |
| 5,982,299 A | * | 11/1999 | Shemwell .................... | 340/953 |

* cited by examiner

*Primary Examiner*—Brent A. Swarthout
(74) *Attorney, Agent, or Firm*—Rodger H. Rast (57) ABSTRACT

An apparatus and method for tracking aircraft wingtip position during taxi operations to prevent collisions with nearby obstructions. A patterned illumination source is attached proximal the wingtips to project a readily discernable target pattern in the direction of taxi travel. At least a portion of the target pattern is reflected off of any obstructions that lie in the straight-line direction of travel, such that the pilot can maneuver to avoid striking the obstruction. By way of example, the patterned illumination source comprises a laser module positioned with the navigation and/or strobe light of the aircraft that is configured to project a circular pattern in front of the wingtip. The device may be retrofitted to existing aircraft without additional wiring with the control of activation being selectable via power cycling of existing aircraft lighting controls.

36 Claims, 8 Drawing Sheets

SYSTEM AND METHOD OF PREVENTING AIRCRAFT WING DAMAGE

CROSS-REFERENCE TO RELATED APPLICATIONS

This application claims priority from U.S. provisional application Ser. No. 60/203,564 filed on May 11, 2000.

STATEMENT OF FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to aircraft safety systems and more particularly to a system and method for preventing collisions between the wingtips of an aircraft moving on the ground and obstructions.

2. Description of the Background Art

Moving aircraft are subject to a variety of situations in which a collision may occur. Recently, advanced GPS systems have been proposed to assure separation between aircraft along their flight paths. Yet one form of collision that is very common among small private aircraft occurs when the pilot taxies the aircraft. Airports are often overcrowded with aircraft while the taxiways are small and may be subject to further encroachment by poorly-parked aircraft. The problem is especially difficult for pilots taxiing in small airports as it is difficult to maneuver the typical 25–40 foot wingspan of a private aircraft amidst a crowded taxiway while keeping the tips from striking other aircraft or obstructions that exist alongside the taxiway. In order to maintain clearance from other aircraft, the pilot while taxiing must look in front of the aircraft and needs to closely monitor the wingtips on either side of the aircraft. The difficulty in judging the proximity of an aircraft wingtip to an obstruction, such as the empennage, propellor, or wingtip of another aircraft should be appreciated. For example, if the tip of the wing is twenty feet (20 ft.) from the pilot, then the pilot must judge possible obstructions in front of the wing are more or less than twenty feet (20 ft.) away. Any error in making this distance judgement can lead to damages to both aircraft. The situation is far removed from a driver attempting to park a car, because a driver is close enough to the periphery of a car, or even a side of the motorhome, to judge the side-distance and generally may only require help in judging the in-line distance to the obstruction. In the situation of an aircraft, however, the position of the obstruction is far removed and distance must be judged in relation to a wingtip which is also far removed from the pilot. During taxiing the pilot is continually attempting to judge if an obstruction is in a forward line with one of the other wingtip. Furthermore, it will be appreciated that the pilot must correctly judge the distance well before the tip of the wing approaches the obstruction so that sufficient room exists to maneuver around the obstruction. If insufficient maneuver room exists, then the pilot will be generally required to shutdown the aircraft use a tow-bar to back up and reposition the aircraft as few smaller aircraft have reversible thrust propellers.

As can be seen, therefore, the development of an apparatus and method for tracking wingtip position between an aircraft moving on the ground and its surroundings would be capable of preventing numerous minor collisions. The system and method of preventing aircraft wingtip collisions in accordance with the present invention satisfies that need, as well as others, and overcomes deficiencies in previously known techniques.

BRIEF SUMMARY OF THE INVENTION

The present invention is a system and method for tracking the relative position of the wingtips of an aircraft by utilizing a light pattern projected forward of the wingtip to aid the pilot in judging the proximity of nearby obstructions. The system employs a set of forward projecting beams, such as from a laser light source, which are configured on the aircraft to project forward of the wingtip to illustrate conditions of an impending collision so that the pilot can easily avoid the obstruction. The beams are projected from the wingtip in a pattern that preferably yields information to the pilot as to both obstruction forward distance and lateral distance. By way of example and not of limitation the beams may be projected as circles, cross-hairs, boxes, and so forth, whose projected size is an indicator of forward distance, and whose projected position on a subject obstruction determines the amount of the obstruction that may be struck should the aircraft continue traversing a straight-path. One or more additional light sources may be incorporated to more precisely gauge distance, or angle, or for aiding with the detection of distance for other aircraft surfaces, such as the tail surfaces. One embodiment is exemplified utilizing a pair of central vertical-fan laser beams coordinated with spiral-rotation laser beams on the tips wherein the distance and relationship of the wingtip and the upcoming object is represented by the light pattern thrown-up on the obstruction.

An object of the invention is to provide additional positional feedback to the pilot of the aircraft relating the position of their wingtips to nearby obstructions.

Another object of the invention is to create a tip tracking system that provides a forward distance reference for the pilot between a wingtip and a possible obstruction.

Another object of the invention is to create a tip tracking system that provides a lateral distance reference which indicates if a collision on a straightforward travel path is likely.

Another object of the invention is to provide a tip tracking system that may be easily implemented on existing aircraft.

Another object of the invention is to provide a tip tracking system that does not require that additional wiring be routed through the wings of an aircraft.

Another object of the invention is to provide a system of tip tracking that is reliable for both daytime and nighttime operations.

Another object of the invention is to provide a system that can optionally provide accurate distance information from the aircraft to obstruction.

Another object of the invention is to provide feedback to the pilot so that operation of the system can be verified.

Another object of the invention is to provide an automatic means of shutting down the tip tracking system to reduce any likelihood of airborne operation.

Another object of the invention is to provide a tip tracking system that may be mounted to the airframe with minimal airflow disruption and commensurate drag.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF INVENTIVE EMBODIMENT

Referring more specifically to the drawings, for illustrative purposes the present invention is embodied in the apparatus generally shown in FIG. 1 through FIG. 13. It will be appreciated that the apparatus may vary as to configuration and as to details of the parts without departing from the basic concepts as disclosed herein.

Figure 1:
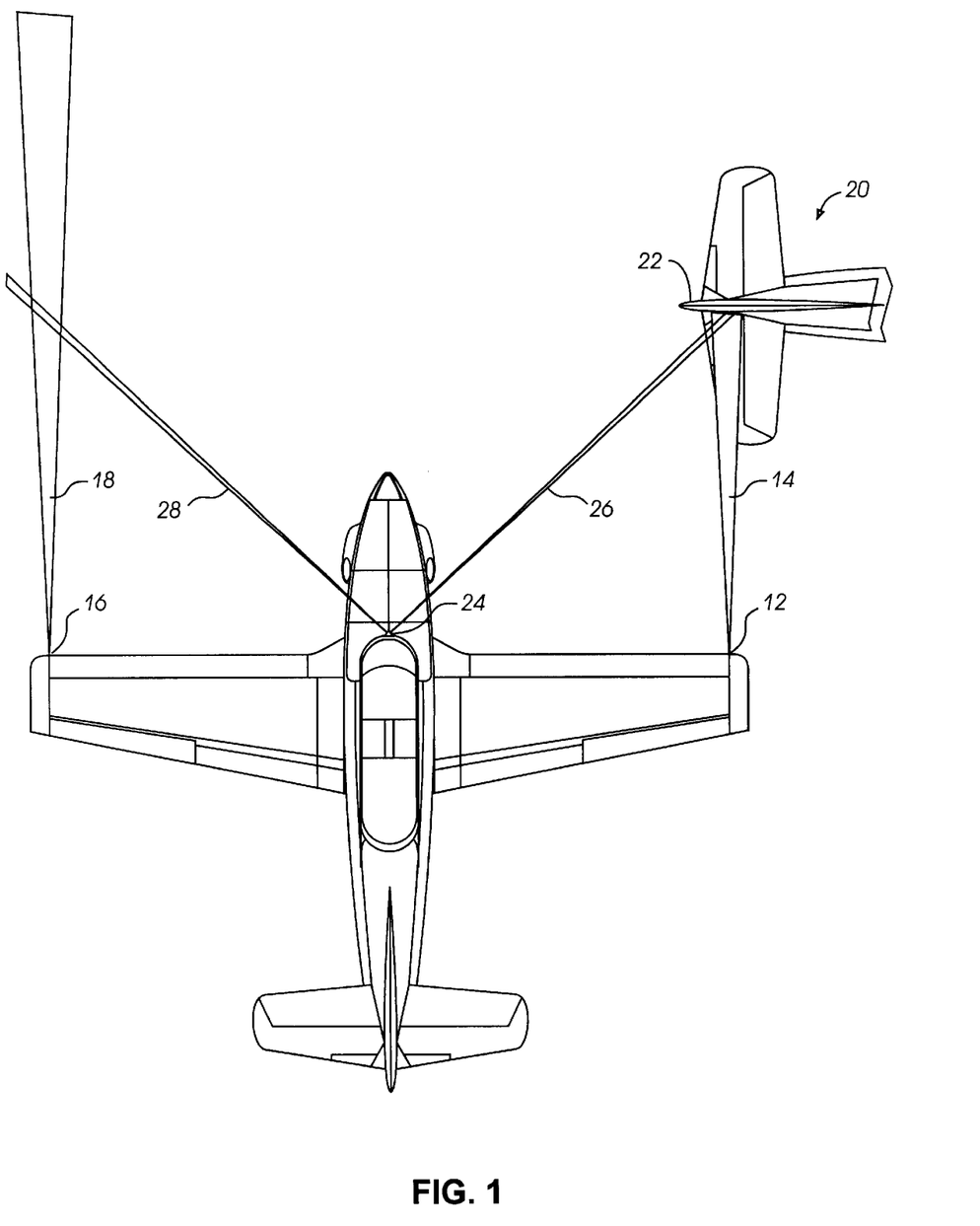
FIG. 1 is plan view of an aircraft which is in imminent danger of collision during taxiing, wherein the tip tracking system according to the present invention has illustrated the impending collision to the pilot by "painting" a circle on the upcoming obstruction.

FIG. 1 illustrates an embodiment of the tip tracking system in use while an aircraft 10 taxies toward an obstruction. The illustration depicts a single obstruction being designated by the system, however, it will be appreciated that in general the pilot has sporadically spaced obstructions on each side and is attempting to navigate a path between the obstructions, a path in which the wing tips will not contact obstructions on either side. The tip tracking system comprises a first wingtip light pattern projection source 12, such as a laser, which casts a beam 14, a second wingtip light pattern projection source 16 which casts a beam 18. Beam 14 in the figure is shown being reflected by a portion of the tail surface of obstructing aircraft 20 primarily on the vertical stabilizer 22. When the beam strikes an obstructing surface it can be said to be "painting" the obstruction, in a similar pattern of terminology utilized for radar equipped fighter aircraft.

An optional distance correlation unit is implemented as a twin beam distance correlation unit 24 is shown projecting an additional distance reference pattern 26, 28, such as vertical slit beams, to accurately register distance information on the same obstruction. The light pattern projection source 12, 16 are preferably attached to the wingtips on the farthest protruding section of the tip, however, it is represented by this figure that the beams can still be utilized when attached more inwardly due to mounting limitations. A significant advantage of mounting the beams on the farthest extension of the wing is that the projected beam is then capable of registering an obstruction in a highly accurate manner even as the closing distance is reduced. The beams are directed in a horizontal plane relative to the aircraft in a taxi configuration and positioned in line with a forward direction of travel such that the beam is painted on a portion of any obstruction that may interfere with the forward movement of the wingtip. In use on a crowded airfield the pilot during straight taxi travel can maneuver the aircraft so that equal fringes of projection appear on opposing sides of the aircraft that disappear as the obstruction becomes closer. If the edge of the beam is still painting a surface as the pilot and aircraft draw near, then the pilot should maneuver in the opposite direction if sufficient clearance exists on that side of the aircraft. It will be appreciated that the beams travel generally in a forward direction and thereby when turning, the distance for which the tip tracker correctly paints an obstructing surface will be reduced.

Figure 2:
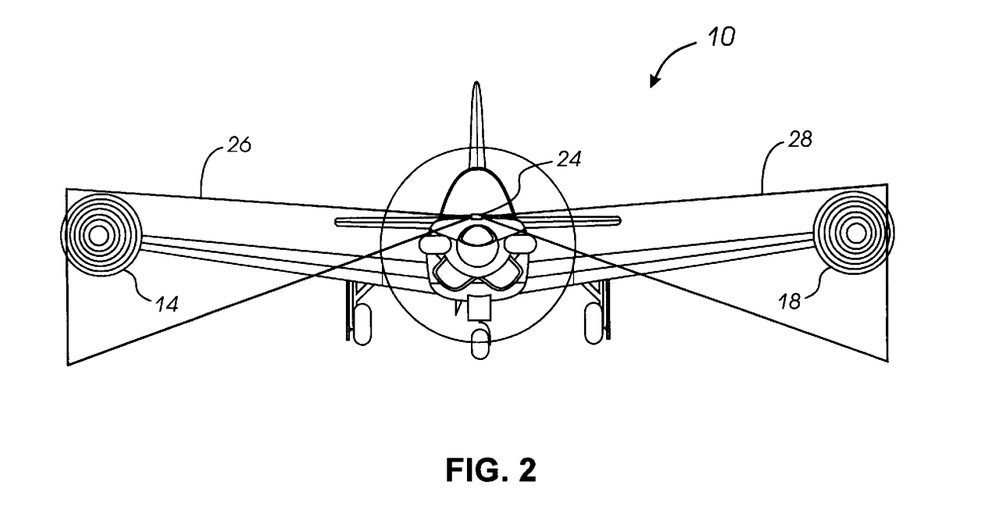
FIG. 2 is a front view of the aircraft of FIG. 1, wherein the forward emitting pattern from the lasers is shown clearly.
Figure 3:
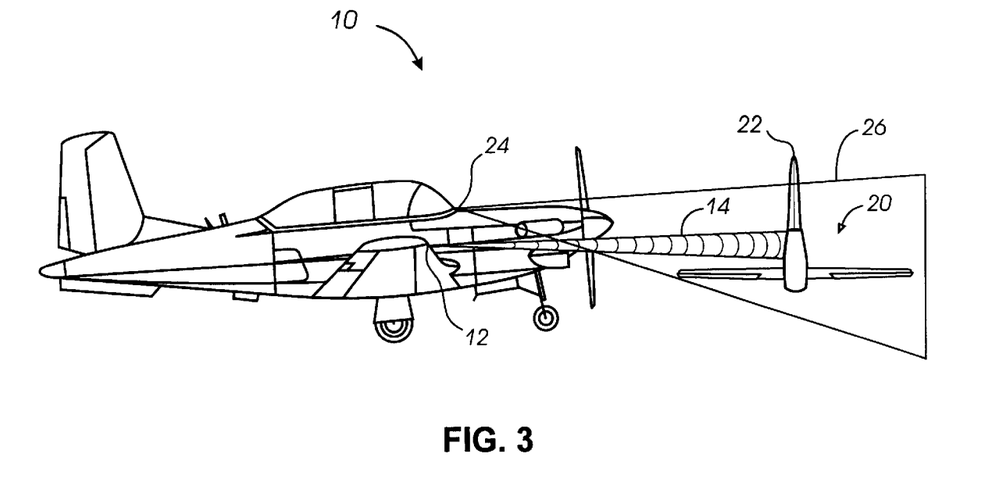
FIG. 3 is a side view of the aircraft of FIG. 2.

One preferred beam pattern is that of a circular cone which subtends an arc of preferably five to ten degrees (5°–10°) that is generally not to exceed twenty degrees (20°). The shape of the pattern can be altered as any recognizable pattern of sufficient size that will provide feedback to the pilot. Projecting a single beam, however, is prone to mislead the pilot and provides minimal recognition regardless of dimension as not unique pattern relative to ambient illumination exists. The use of a small beam would be further hindered by the fact that the wingtip is of finite dimensions and a small beam would not provide a range warning or a degree of clearance for the wing. Furthermore, the obstruction may contain irregularities, such as cutouts, voids, notches, and grooves, that may conceal a small patch of light. It will be appreciated that the patterning of the projected illumination preferable comprises the projection of a pattern, such as circle, square, ellipse, and so forth which has both horizontal and vertical components and for which size may be relatively easily gauged by a pilot as an indicator of wingtip to obstruction distance. The aforementioned pattern may be created in the illumination by a number of known mechanisms, for example, optical masks, graticules, lenses containing masks, faceted lenses, mirrored reflectors, optical redirection, and mechanical redirection. The latter approach is utilized within this embodiment with the wingtip beams being projected as circularly rotating beacons to increase recognition and interface with the upcoming surface. Rotation is generally preferred over using a circular graticule as it provides more apparent light to the eye and ease of recognition over a number of surfaces. A moving mirror or lens may also be utilized for redirecting the projected beam to traverse a desired pattern. However, it will be appreciated that the use of a graticule or other light pattern spreading mechanism can be implemented within the present invention at a lower cost with fewer parts. The preceding generally describes the use of a laser light source as it provides a high intensity collimated beam of projected light. Other sources of illumination may be alternatively utilized, such as non-collimated light sources of sufficient intensity, such that the amount of patterned light which is projected in the direction of travel is sufficient for the pilot to properly discern distances. A non-collimated light source may alternatively be collimated into a projected patterned beam by the use of lenses, mirrors, or housings which partially surround the light source and allow a column of light to escape from an aperture therein. Numerous alternative optical mechanisms can be utilized to provide a beam covering a set forward angle with light for painting the surface of a forward obstruction. The central twin beam distance correlation unit 24 is preferably implemented to cast vertical slit beams 26, 28 out forward of the wings as a vertical projection which intersects the tip beams at a fixed distance as shown. It will be appreciated that multiple beam correlation units could be utilized. A graticule or alternative optical device may be used for generating the slit beam. Alternatively the central twin beam unit may project a series of vertical projections in similar fashion to a scale wherein different forward distances are thereby represented by the intersection with the wingtip beam units 12, 16. At a predetermined fixed distance, the vertical line projected by the central twin beam unit 24 splits the circular pattern generated by one of the wingtip beams 12, 16 on the obstruction painted by the beams. It should be recognized that the diameter of the beam painted on the obstruction indicates, albeit less precisely, the distance from the wing tip to the obstruction. FIG. 2 and FIG. 3 provide additional views of the light beam patterns emitted and their interaction with the obstruction.

Figure 4:
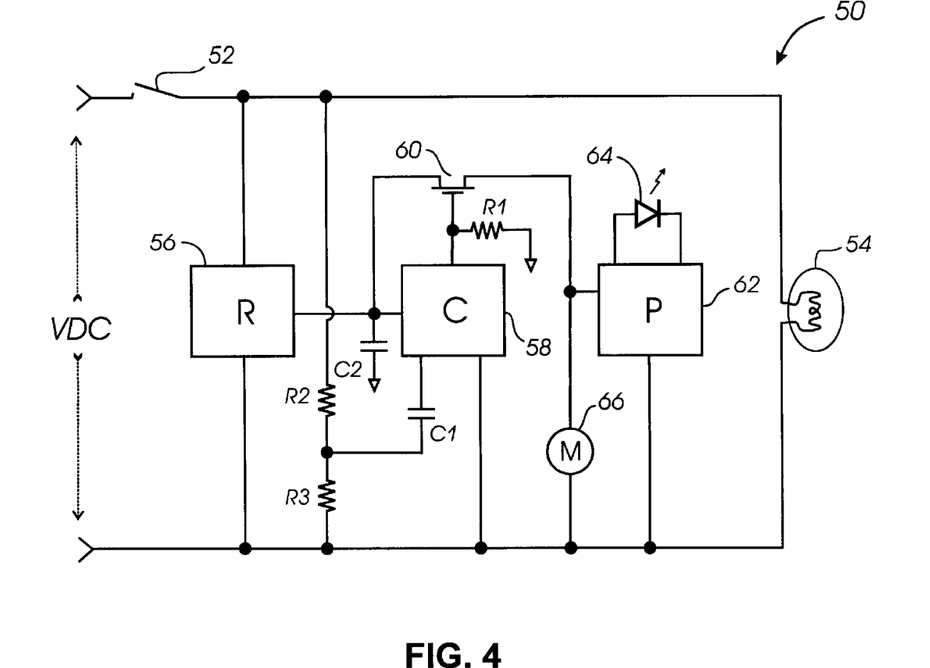
FIG. 4 is a schematic of a navigational light circuit shown with the tip tracking circuit according to one aspect of the present invention.

FIG. 4 depicts a power activation circuit 50 for driving a wingtip light pattern projection source 12, 16, as shown in FIG. 1, which by way of example are considered to be laser light sources. Power activation circuit 50 is configured to activate the patterned projection sources upon receiving an electrical signal from a control device. A number of control devices may be utilized for controlling the power activation circuit, including other devices, switches, or existing power switches that are cycled in a pattern. Conventional navigation light systems provide a direct current voltage source through an activating switch 52 to one or more incandescent tip light 54, such as running lights or colored navigation lights (either red or green). The tip tracker circuit 50 is preferably connected into the power to the tip light such that a regulator 56 provides a stepped-down voltage to a controller 58 which is capable of modulating a switch 60, preferably a FET, through which power is provided to a laser diode power supply 62 powering a laser 64, and supplying power to a small motor 66 for driving the beam in a circular rotation. The system is shown for use in an aircraft in which no additional control wiring is routed from the cockpit. In this implementation the pilot merely toggles a pilot accessible activation switch mechanism, such as the running lights in a sufficiently predetermined pattern to create an electrical signal for detection by the power activation circuit. For example, the pilot toggles the navigation lights ON, OFF, and then ON again wherein the first ON and OFF intervals are between approximately one half second, and one and one half seconds, (½ S to 1 ½ S), which signals the power activation circuit of the tip tracker system to enable and operates the patterned projected illumination beams, laser 64, for a fixed period of time. Controller 58 powers-up when power is first engaged and is preferably configured with a timer circuit to disengage power to the patterned projected illumination sources after a selected interval of time has elapsed. Controller 58 is configured to remain operating even when the power is off for a number of seconds, the amount of time being determined by the value of capacitor $C_2$ that retains a charge sufficient to sustain operation for 1–2 seconds. The controller upon power-up monitors for a subsequent OFF period (of less than 1–2 seconds) after which power is restored. Upon meeting these conditions the controller activates switch 60 to engage the laser LED and engage the motor 66. After engaging them, the controller 58 preferably metes out a period of operating time, such as one minute, after which the unit shuts down the motor and laser as they need not be operating during flight operations. If the pilot later encounters a constricted taxiway they may resequence the power to the running lights to gain additional system operating time. The circuits on the opposing wingtip and the central dual beam unit can operate with identical circuitry. In addition, the system can be connected with the strobe unit, however, strobes typically operate from extended voltages generated by a step-up power supply located within the aircraft fuselage and run through the wiring to the wingtip—although such voltages can be converted by the power unit shown in FIG. 4, additional design considerations and compatibility issues come into play. When deployed in a new aircraft design it may be desirable to utilize a separate switch and power routing to individually control power to the tip tracking unit. It will be appreciated that many forms of selective activation may be alternatively implemented by a person of ordinary skill in the art without departing from the present invention.

Figure 5:
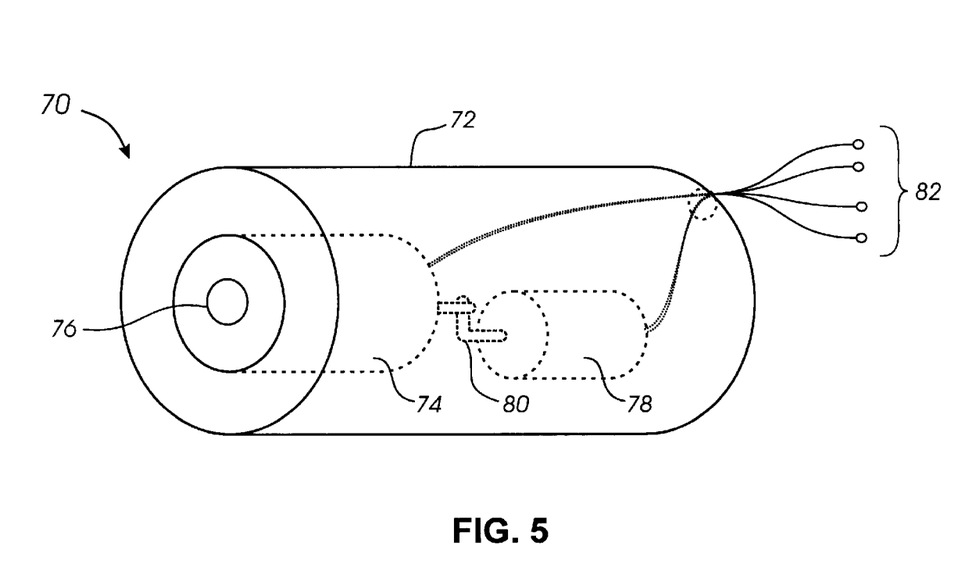
FIG. 5 is a diagram of a motor-driven rotational laser source utilized within an embodiment of the present invention.

FIG. 5 depicts a rotating wingtip beam 70 wherein a tube 72 houses a laser module 74 that preferably contains the circuits 50, shown without switch 52, incandescent light 54, and motor 66. A motor housing 78 is shown positioned within the tube 70 and the shaft of the motor 80 is configured with an angled crank for rotating the end of the laser 74 to provide angular rotation thereof. The crank from the motor can also be configured with a compliant member whereby the speed of the motor determines the angular displacement of the laser during rotation, so that the controller can generate spirals or other features by varying the speed of the motor. The motor may be controlled by the controller independently of the laser to provide for independent actuations of the laser and motor for such features. It will be appreciated that the laser may be moved by various other means which will be readily apparent to one of ordinary skill in the art. The end of laser 74, opposite the attachment with the shaft of the motor 80 is flexibly attached within tube 70, such as by an encircling compliant ring, flexible. attach points, or gimballing. In addition, the laser 74 is preferably provided with shock mounting within tube 70, as the performance of presently manufactured laser diodes is negatively impacted when subjected to a shock force of a sufficient "G" level. The light pattern projection sources may be mounted in various ways to the wingtips of an aircraft. For example, laser tube 70 can be mounted in the leading edge of the aircraft tip nacelle, or otherwise in a forward facing portion near the wingtip by various forms of mounting hardware. The tip beam and central twin beam unit may be suitably mounted on high-wing, low-wing and mid-wing aircraft. It should be recognized that other extended aircraft surfaces, such as the tips of the horizontal stabilizer, may be additionally protected in specialized instances by use of its own tip tracking system.

Figure 6:
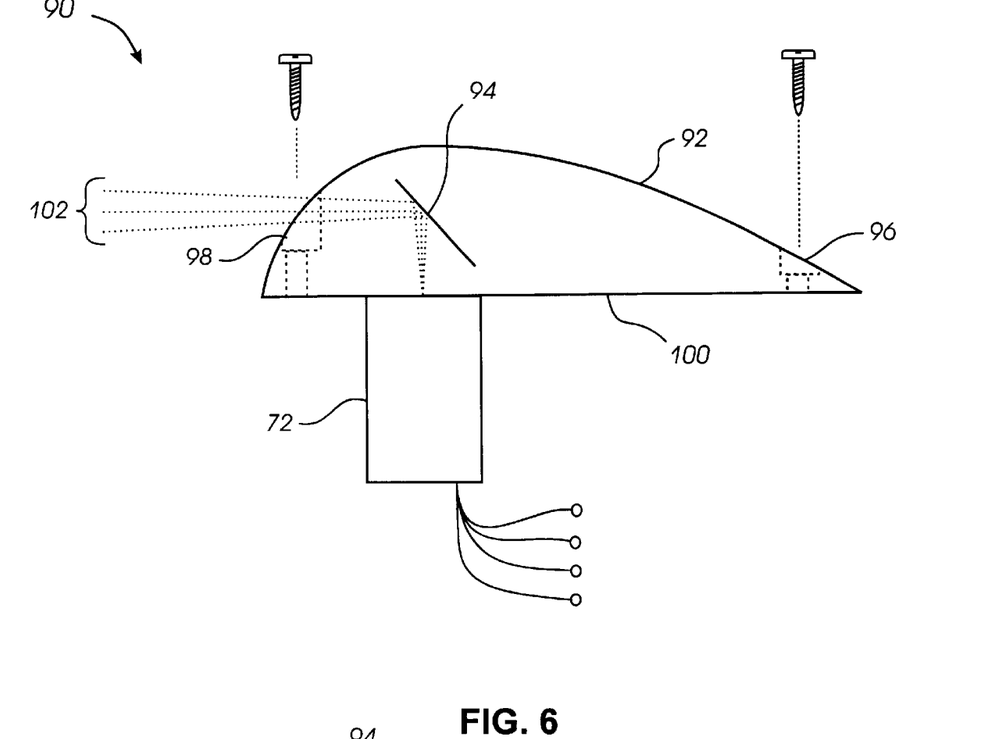
FIG. 6 is a side view of a vertically mounted wingtip laser source employing a mirror for directing the beam forward.
Figure 7:
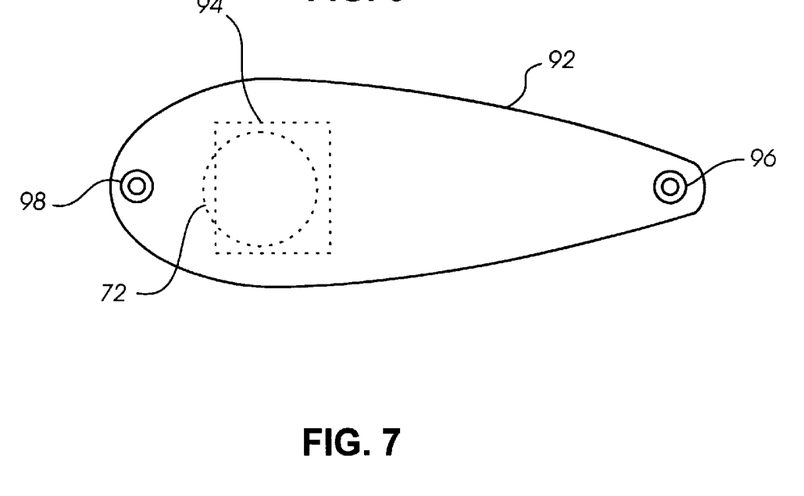
FIG. 7 is a top view of the wingtip laser source of FIG. 6.

FIG. 6 and FIG. 7 depict an easy to install wingtip beam module 90 having a teardrop shaped housing 92 that utilizes a mirror 94 for redirecting the beam forward. The housing 92 is configured with attachment points 96 and 98 to allow fasteners to engage the unit with the aircraft. The laser beam 102 is shown projected forward of the aircraft. Using the teardrop shaped housing provides for a simplified mounting of the unit to either low or high wing aircraft and facilitates adjustment. It will be recognized that additional beam adjusters, such as threadable shafts engaging the mirror, may be included to provide for additional calibration of beam position after the units have been mounted.

Figure 8:
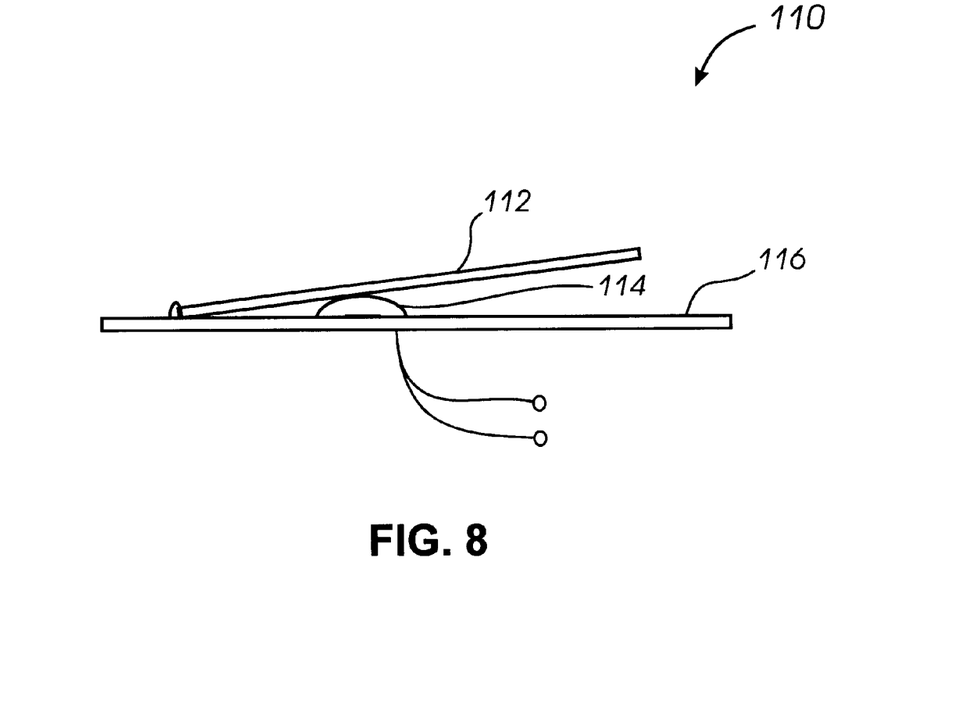
FIG. 8 is a top view of a simple form of automatic shut-off device according to an aspect of the present invention.
Figure 9:
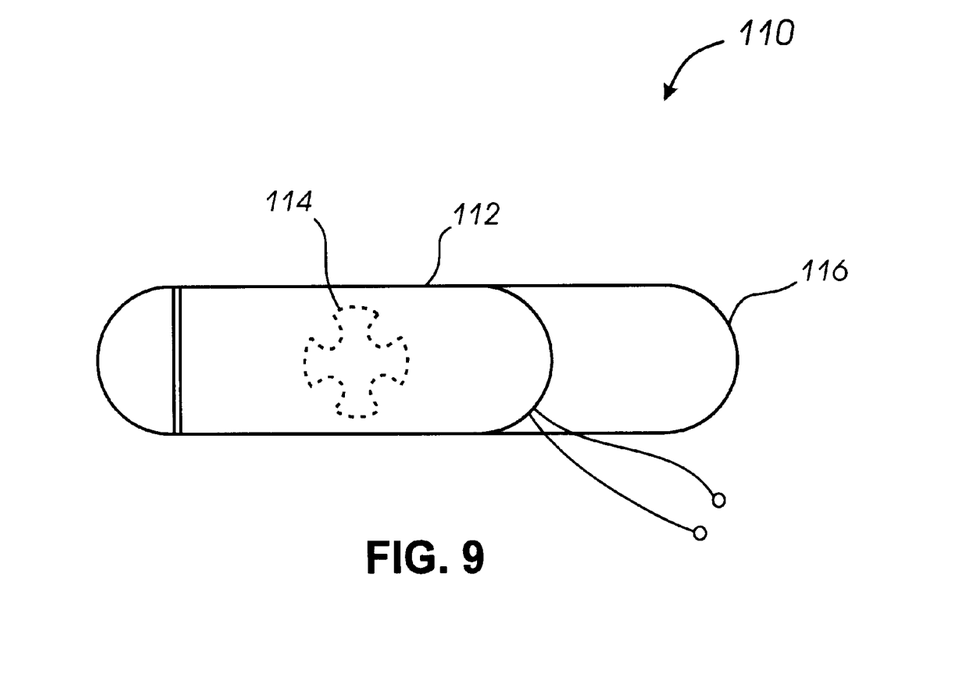
FIG. 9. is a facing view of the automatic shut-off device of FIG. 8.

FIG. 8 and FIG. 9 depict a simple automatic shut-down circuit 110 that can be employed to assure that the unit shuts down prior to becoming airborne. A bifurcated flapper style switch comprising a front surface 112 a dome contact 114 and a rear surface 116 having contacts which are electrically bridged upon the collapse of dome 114 that occurs upon a given air-pressure level being achieved. Numerous variations of speed sensors are common in the art, wherein temperature differences, pressure differences, or acoustic changes may be sensed. When the speed of the aircraft increases beyond taxi speed the switch closure is sensed by the controller unit which shuts down the tip tracking system. The speed of the aircraft can be sensed from a central point, or driven from the aircraft speed sensor, such that the power to all navigation lights is interrupted for a period exceeding a few seconds to assure that all tip tracking beams are reset by the controller to an off-mode. Preferably an additional watchdog circuit is incorporated within each controller circuit to monitor the conditions and output of the principle controller and to shut down the units principle controller, laser beam, and motor if the principle controller attempts to operate erroneously.

Figure 10:
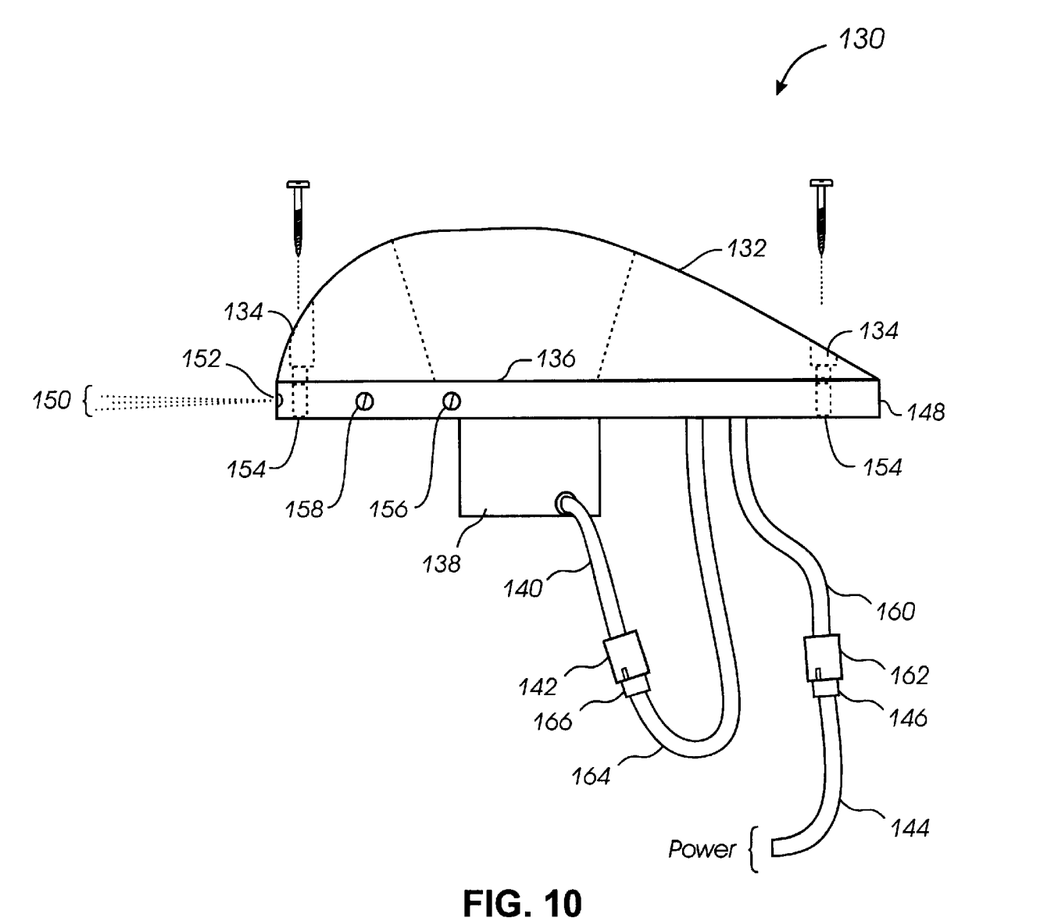
FIG. 10 is a side view of a light element for a tip tracking system which is configured for mounting in combination with a conventional navigation or strobe light.

FIG. 10 is an embodiment of a navigation light system 130 which incorporates a light projection element 148 of the tip tracking system. To minimize cost and installation difficulty the tip tracking system may be combined to mount in association with a conventional navigation light 132 (shown in phantom). The conventional navigation light 132 is configured as a transparent lens having mounting holes 134 and an inner surface 136 which is retained against the wingtip of the aircraft. Typically an extended portion 138 extends into a cutout in the wingtip. Wiring 140 exits the navigation light unit and terminates in connector 142 which is configured for connection to a navigation light power cable 144 configured with connector 146.

A tip tracker unit 148 is shown containing the light pattern projection source and electronics. It should be appreciated that the system may be implemented by simply installing the "piggyback" style devices on either wingtip and then adjusting the units for proper alignment. No additional electronics, wiring, or other configuration needs be performed in order to complete the simple installation shown. The housing is configured to mount in combination with a navigation light unit, strobe light unit, or combination unit. The unit is configured to emit a patterned beam 150 from a light pattern light source 152. The housing for the tip tracker is configured with similar mounting configuration, such as holes 154, to mount in combination with the conventional light assembly 132. It will be appreciated that few vendors exist for the navigation lighting systems and therefore mounting patterns are generally standardized. The direction of the emitted light pattern can be preferably adjusted through a predetermined range by a horizontal adjustment 156 which changes the forward angle in relation to the direction of travel, while vertical adjust 158 is used for altering the vertical projected pattern so that it is projected horizontally in front of the aircraft when it is configured for taxiing.

During the installation of the tip tracking system the cable 144 and connector 146 for navigation light power has been reconnected to the tip tracking module through a cable 160 with connector 162. The tip tracking module thereby receives operating power and signals and routes power to the conventional navigation light through cable 164 having connector 166 which is interfaced to connector 142 of the navigation light unit. It should be readily appreciated that the tip tracking unit may be integrated into the design of a combination tip tracker/navigation light, or one that alternatively, or additionally comprises a strobe light unit.

Figure 11:
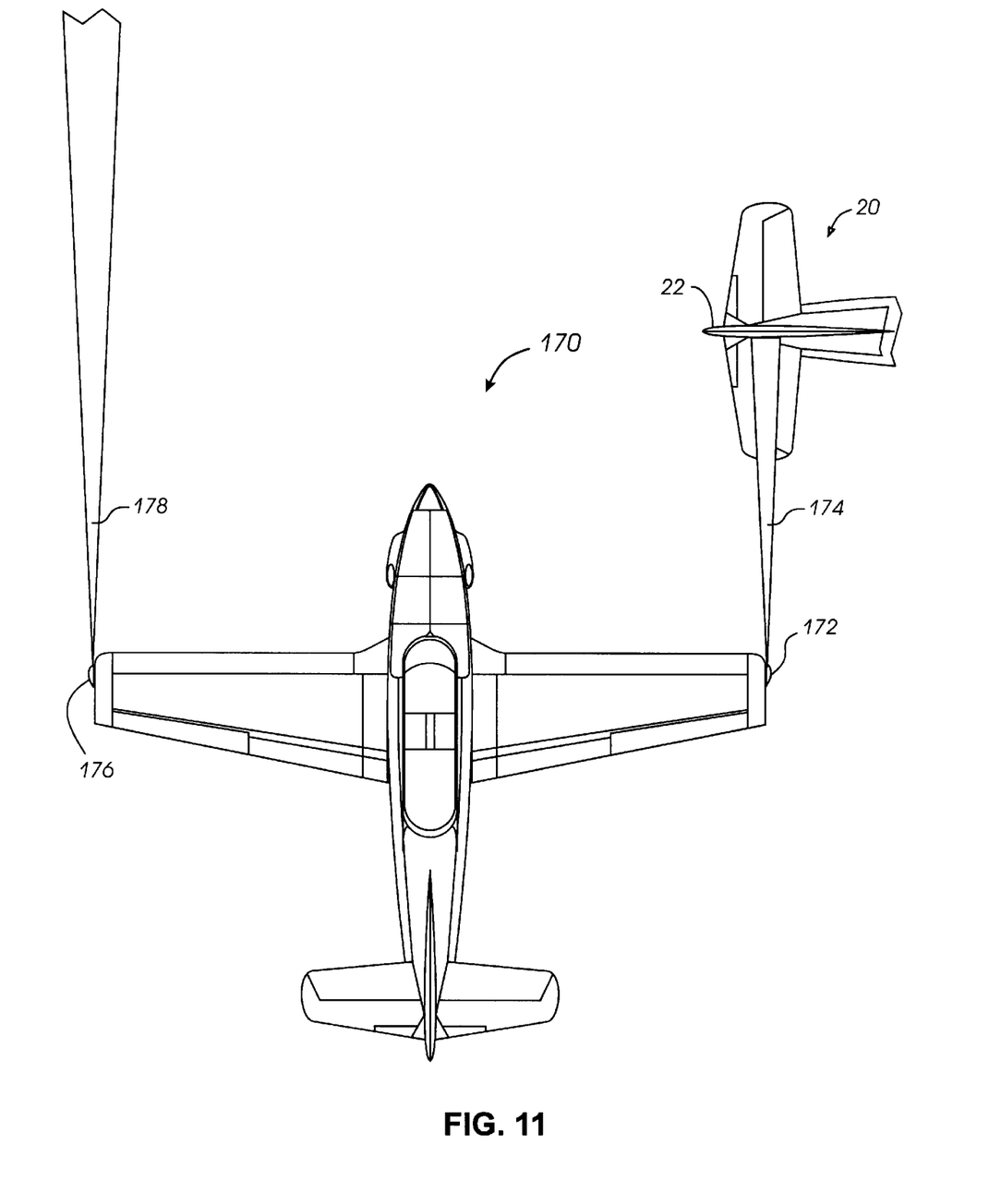
FIG. 11 is a plan view of an aircraft to which the tip tracking units of FIG. 10 have been mounted according to an embodiment of the present invention.

FIG. 11 illustrates an aircraft 170 with tip tracker units 172, 176, installed which are similar to that of FIG. 10. Tip tracker unit 172 projects illumination pattern 174 and tip tracker unit 176 projects illumination pattern 178. As these tip tracker units are shown mounted within approximately one to two inches of the extreme tip exterior they are capable of registering a possible collision at closer ranges than projection unit mounted further inboard, such as shown in FIG. 1. It will be appreciated that the tip tracking system may be employed without the central dual beam distance correlation unit for providing accurate distance marking beams which intersect the beams from the forward facing wingtip beam units. Aircraft 170 is shown having a simplified installation of the tip tracker system which utilizes light projection units on only the outboard wingtips of the aircraft without the use of a distance correlation unit.

The preceding descriptions of tip tracking systems utilize a general method of detection wherein a source of illumination is generated; patterned into a shape that conveys position and distance while being easily discerned from back ground illumination; and the projecting of the patterned illumination in the direction of travel at the extremity of the aircraft object, such as wingtip, that is subject to encountering obstructions. The pattern of the light source may be created by numerous methods such as by using masks, or preferably by varying the direction of illumination projection. As continuous operation of the tip tracking system could be distracting to other pilots and airport personnel, the tip tracking system is preferably configured for activation upon receipt of an activation signal. The power activation circuit detects the signal and engages the illumination sources by supplying them with power which is converted to light energy. The tip tracking system may be deactivated manually, and is preferably subject to a timed deactivation, or optionally an airspeed driven deactivation to reduce the unwarranted projection of light.

Figure 12:
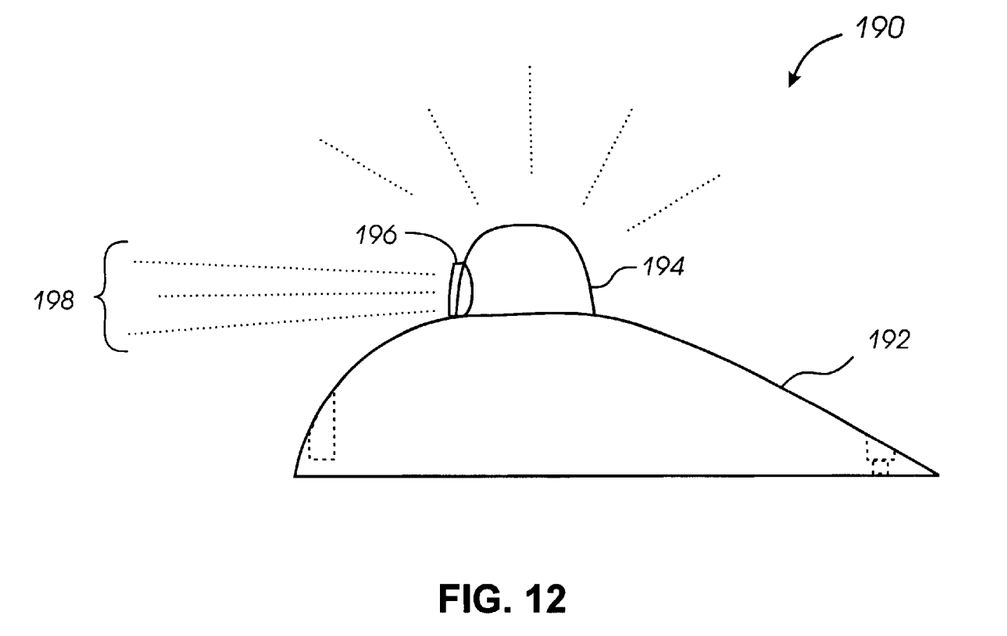
FIG. 12 is a side view of a light element upon which a light patterning device have been attached according to an aspect of the present invention.
Figure 13:
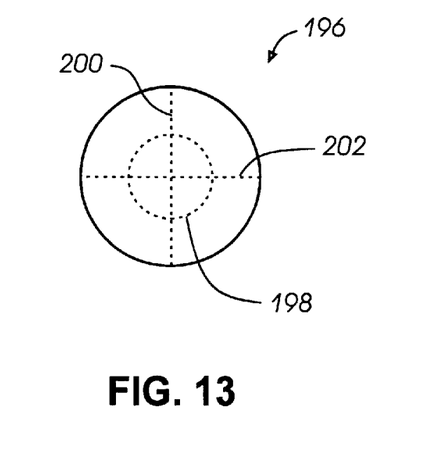
FIG. 13 is a facing view of the light patterning device of FIG. 12 configured for mounting to a strobe or navigation light according to an aspect of the present invention.

It will be appreciated that wide variations in circuit implementation may be provided for without departing from the teachings of the present invention. A less preferred version is shown in FIG. 12 and FIG. 13 which utilizes the light power of the strobe to provide targeted illumination through a patterned lens, or graticule. A combination navigation light/strobe light 190 is shown in FIG. 12 with a navigation light 192 into which is integrated a strobe light 194. Tip tracking is achieved with the strobe light by affixing a light patterning device 196, such as lens containing a graticule or pattern, onto the forward exterior of the strobe light. FIG. 13 shows a view of a preferred pattern for the light patterning device 196 which is shown configured with a circular light obstructive pattern 198, a vertical line obstruction 200, and a horizontal lines obstruction 202. A lens shaped device can be made for attachment to existing strobe lights, such as by utilizing optically clear adhesives, to provide the patterned light effect. It should be realized, however, that resultant tip tracker may be subject to a number of drawbacks, such as loss of pattern definition, due to the non-point source nature of the illumination, and a limited range over which the pattern will be visible.

Furthermore, since the strobe light is a white light, it may prove difficult to view the system during operation in daylight. A light patterning device could be similarly created for use on the navigation lights, however, it will be appreciated that the light intensity of the navigation lights is far less than that of the strobes such that recognition of the pattern in a possible obstructive surface may be further reduced.

A number of implementation examples for the tip tracker system have been shown by way of example in the previous description, however, a number of variations may be implemented by one of ordinary skill without the need of creative efforts. The light sources have been shown utilizing laser lights, however, it will be recognized that other light sources are capable of functioning to project beams of light through a pattern so that the reflection can be recognized. Various mounting configuration were shown by example, however, the tip tracker may be mounted in various other configurations in which the light is projected forward of the travel of the surface to be protected.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for tracking a horizontal plane projecting forward of aircraft wingtips for detecting obstructions therein, comprising:

a collimated light source adapted for positioned attachment on an aircraft wing proximal the wingtip;

said collimated light source as coupled to said wing directed in a horizontal plane relative to the wingtip of said aircraft, which is in a taxi configuration, said horizontal plane positioned in line with a forward direction of travel wherein the beam would be reflected on a portion of any obstruction that may interfere with the forward motion of said wing; and means for generating a high definition two dimensional pattern in said collimated light source so that wherein the reflection of said pattern on an obstruction forward of said wingtip may be easily readily discerned by the pilot of said aircraft, as being from said light source, while providing distance and positioning information in relation to the said obstruction that lies in a horizontal plane forward of said aircraft during taxi operations.

2. An apparatus as recited in claim 1, wherein said means for generating said high definition two dimensional pattern in said collimated light source comprises an optical mask that selectively allows light to be optically transmitted.

3. An apparatus as recited in claim 1, wherein said means for creating said high definition two dimensional pattern comprises:

an optically transmissive member;

said optically transmissive member directing light toward the direction of said aircraft travel; and a non-optically transmissive pattern joined to the optically transmissive member for blocking light so that a predetermined high definition two dimensional pattern may be discerned.

4. An apparatus as recited in claim 1, wherein said means for generating said high definition two dimensional pattern comprises means for redirecting said collimated light from said light source to traverse a regular two dimensional pattern.

5. An apparatus as recited in claim 1:

wherein said means for redirecting said collimated light to traverse a pattern comprises an electromechanical device adapted for modulating the direction of said light source along a regular two dimensional pattern;

wherein said pattern comprises a two dimensional pattern of lines whose reflection is readily discernable on an obstruction.

6. An apparatus as recited in claim 1, wherein said means for redirecting said collimated light comprises an optical device capable of redirecting light to follow along said two dimensional pattern.

7. An apparatus as recited in claim 1, wherein said collimated light source comprises a laser light source.

8. An apparatus as recited in claim 1, wherein the light source comprises:

a non-ollimated light source; and a collimating member coupled to said non-collimated light source to direct light through a two dimensional pattern in the direction of wingtip travel, wherein a high definition two dimensional pattern is generated.

9. An apparatus as recited in claim 8, wherein said collimating member comprises a lens configured for generating a high definition two dimensional pattern.

10. An apparatus as recited in claim 8, wherein said collimating member comprises a housing which partially surrounds said light source and has an aperture through which light is collimated.

11. An apparatus as recited in claim 1, further comprising additional means for projecting light patterns positioned at angles to one another to provide accurate distance information to the pilot.

12. An apparatus for tracking the intended forward movement of the wingtips of an aircraft relative to obstructions, comprising:

a light pattern projection source adapted for being retained proximal to each wingtip and oriented to direct said light pattern in a horizontal plane positioned in line with a forward direction of travel; and said light pattern projection source configured to project a two dimensional beam pattern subtending a narrow substantially conical arc forward of the wingtip in the direction of travel to direct said two dimensional beam pattern of light on obstructions along the horizontal path of the wingtip that pose an obstructive hazard to travel.

13. An apparatus as recited in claim 12, wherein said narrow arc subtends less than approximately 20 degrees of arc.

14. An apparatus as recited in claim 12, further comprising a power activation circuit for the light pattern projection source which is connected to an existing source of power and is configured to activate the light pattern projection source in response to a received electrical signals superimposed on said source of power from a control device.

15. An apparatus as recited in claim 14, wherein said power activation circuit further comprises a timer circuit for disengaging power from said light pattern projection source after a selected interval of time has elapsed.

16. An apparatus as recited in claim 14, wherein said power activation circuit further comprises an airspeed sensor that is configured to deactivate the power to said light pattern projection source when an airspeed in excess of typical taxiway speeds are attained.

17. An apparatus as recited in claim 15, wherein the control device comprises a pilot accessible activation switch mechanism which is capable of generating an electrical signal to said power activation circuit.

18. An apparatus as recited in claim 17, wherein said control device comprises an existing activation switch that is cycled in a sufficiently predetermined pattern so as to create an electrical signal to be registered by said power activation circuit.

19. An apparatus as recited in claim 18, wherein said control device comprises a power switch that controls the activation of conventional aircraft lighting, that upon being cycled in a sufficiently predetermined pattern, creates an electrical signal to which the power activation circuit responds by activating said light pattern projection source.

20. An apparatus as recited in claim 12, wherein said light pattern projection source is attached proximal to each wingtip in a separate housing unit.

21. An apparatus as recited in claim 12, wherein said light pattern projection source is attached proximal to each wingtip in combination with existing navigation or strobe lights or combinations thereof.

22. An apparatus as recited in claim 21, wherein said light pattern projection source is retained in a housing that may be installed between and existing navigation, strobe, or combination lighting housing and the wingtip of said aircraft.

23. An aircraft wingtip tracking device to prevent collisions with obstructions while the aircraft is being taxied, comprising:
   a laser light source adapted for attachment proximal the tip of a aircraft wing and directed in a horizontal plane along the path of travel during taxi operations for said aircraft;
   said laser light source adapted for projecting a two dimensional pattern of illumination whose relative size reflecting from an obstruction along the path of said wing conveys distance information and which is readily discernable from ambient lighting of an obstruction; and
   a power activation circuit which activates said laser light source in response to the receipt of a pilot activated electrical signal.

24. An aircraft wingtip tracking device as recited in claim 23, wherein said pattern incorporates a substantially circular pattern.

25. An aircraft wingtip tracking device as recited in claim 24, further comprising a motor, or equivalent, coupled to said laser light source for rotating said laser light source to produce said substantially circular pattern.

26. An aircraft wingtip tracking device as recited in claim 23, wherein said two dimensional pattern is created by an optical device selected from the group of optical device consisting of graticules, faceted lenses, and masks.

27. An apparatus as recited in claim 23, wherein said two dimensional light pattern projection source is adapted for attachment proximal to each wingtip in a separate housing unit.

28. An apparatus as recited in claim 23, wherein said light pattern projection source is adapted for attachment proximal to each wingtip in combination with existing navigation or strobe lights or combinations thereof.

29. An apparatus as recited in claim 28, wherein said light pattern projection source is retained in a housing that may be installed between and existing navigation, strobe, or combination lighting housing and the wingtip of said aircraft.

30. A method of detecting obstructions along the horizontal plane of an aircraft wing that are positioned along the path of said aircraft wing as it is being taxied, comprising:
   generating a source of illumination centered on a horizontal plane projected forward of said aircraft wing along the travel path;
   patterning said illumination into a two dimensional pattern wherein a reflection from an obstruction allows distance to be easily discerned from pattern size and which can be readily discerned by a pilot or crewmember from ambient reflected lighting on an obstruction surface; and
   projecting said illumination in the direction of travel at the extremity of the aircraft object which is subject to contacting obstructions.

31. A method as recited in claim 30, wherein said illumination is generated by a laser light source.

32. A method as recited in claim 30, wherein generating said illumination comprises:
   detecting an activation signal; and
   converting electrical power to light energy after receipt of activation signal.

33. A method as recited in claim 32, wherein said converting of electrical power to light energy is suspended after a predetermined period of time.

34. A method as recited in claim 32, wherein said detecting of said activation signal comprises detecting power transitions of a predetermined timing pattern.

35. A method as recited in claim 30, wherein said patterning of said illumination is performed by passing said illumination through an optical mask.

36. A method as recited in claim 30, wherein patterning of said illumination is performed by varying the direction of projection according to with a pattern.

* * * * *